United States Patent Office 3,702,718
Patented Nov. 14, 1972

3,702,718
BUSHING
Donald E. Tassell, Grand Rapids, and Forest L. Middleton, Middleville, Mich., assignors to Lescoa, Inc., Grand Rapids, Mich.
Continuation-in-part of abandoned application Ser. No. 69,715, Sept. 4, 1970. This application Oct. 18, 1971, Ser. No. 190,005
Int. Cl. F16c 23/04
U.S. Cl. 308—72
12 Claims

ABSTRACT OF THE DISCLOSURE

A bearing structure particularly adapted for connecting the extremity of one of the power transmission links of a windshield wiper system to a stud member secured near the extremity of a lever arm, the bearing structure permitting canting as well as rotational movement of the components with respect to one another. The bearing structure includes a cylindrical bearing member having an outer external spherical flange-like portion about its outer diameter. Two O rings positioned about the spherical portion cooperate to form a spherical seat for the flange. This assembly is retained on the link by means of a cap, suitable apertures being provided in the cap and link through which the axial extremities of the bearing protrude.

CROSS REFERENCE TO RELATED APPLICATION

This application is a continuation-in-part of copending, commonly assigned application Ser. No. 69,715, filed Sept. 4, 1970, now abandoned.

BACKGROUND OF THE INVENTION

This invention relates to bushings and, more particularly, to bushings particularly adapted for use in environments requiring canting ability such as windshield wiper systems.

There is disclosed in U.S. Pat. No. 3,316,033 a bearing assembly particularly adapted for utilization in the interconnection of automotive windshield wiper linkage. While the structure illustrated in this patent and minor variations thereof have been well accepted in the trade, certain problems have been present. The device, for example, is relatively difficult to manufacture because of the "push through" assembly method required. It is difficult, furthermore, to obtain proper "centering" of the bushing in the assembly and even seemingly minor discrepancies create serious problems since they are magnified by the wiper pattern. The resilient mounting, additionally, is a rather specialized part and must be fabricated specifically for utilization in the bushing assembly. Problems have been encountered, additionally, with the canting ability of this structure since, because of its mode of assembly and structure, it is rather "stiff" when completed, canting depending solely upon the deformation of the resilient mounting utilized. In addition, the resilient mounting, when canted, exerts a constant bias force on the bushing contributing greatly to wear of the component parts.

OBJECTS AND SUMMARY OF THE INVENTION

It is an object of this invention, therefore, to provide a bushing of the type described which, while retaining the advantages of the prior art structure, cures many of the noted defects thereof.

It is an object of this invention, more particularly, to provide a bushing utilizing relatively standard components which may be assembled together easily, requiring no "push through" mode of assembly.

It is yet another object of this invention to provide a structure of the type described wherein accurate centering of the bushing can be achieved with little problem, thus prolonging both the life and efficiency of the resultant structure.

It is an object of this invention, additionally, to provide a structure of the type described wherein canting is achieved not only through deformation of the elastic mountings, but, additionally, through physical movement of the bushing within the mounting.

It is still a further object of this invention to provide a structure of the type described which may be manufactured with greater economy than has been achieved previously in the manufacture of prior art bushings.

These as well as other objects are achieved through the provision of an opening in the elongated link having affixed thereover a bearing retaining cover. The cover also has an opening in one surface thereof, the two openings being aligned. The facing surfaces of the cover and link are spaced from one another by a skirt-like member which defines a generally enclosed compartment therebetween. Within the compartment is positioned a cylindrical sleeve bearing of anti-friction material, the bearing including a generally spherical or ball-shaped flange on the outer surface thereof positioned within the compartment. One axial extremity of the bearing protrudes through the opening in the link and the other through the opening in the cover.

First and second separate ring-like resilient members surround the spherical flange on the bearing within the compartment and cooperate to form a seat for the flange. The relative dimensions of the compartment, the members and the spherical flange being such that the bearing is resiliently restrained within said compartment by the members to permit both canting and rotational movement of the link with respect to the component to which it is attached. The spherical flange in effect, constitutes the ball portion of a ball and socket joint and the ring-like member form the socket.

DESCRIPTION OF THE FIGURES AND PREFERRED EMBODIMENT

The following description of the preferred embodiment of this invention will be readily understood by those skilled in the art through reference to the following figures in which.

Figure 1:
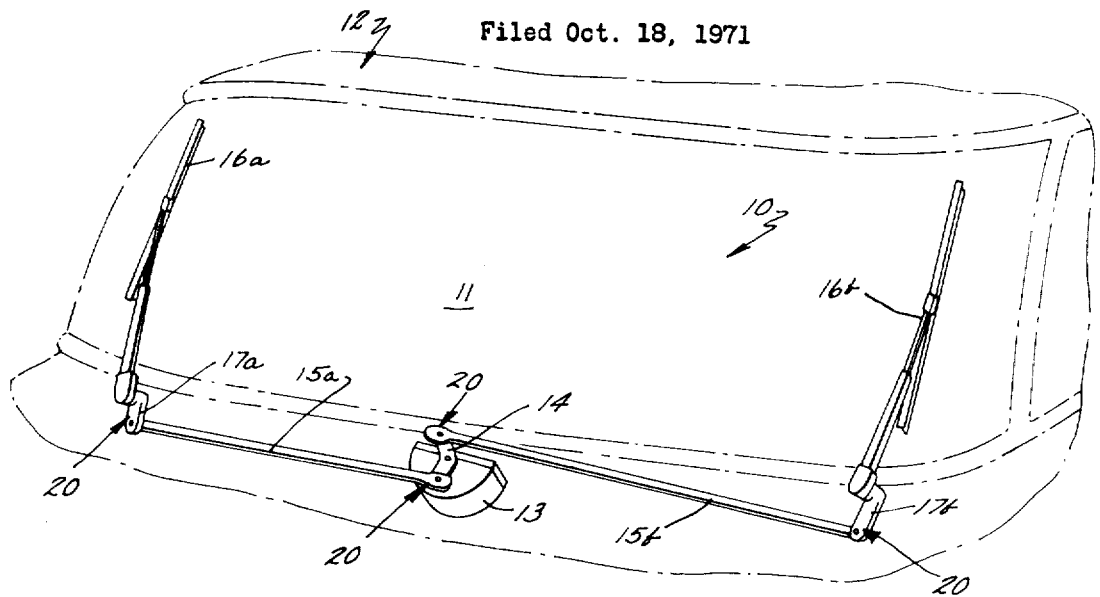
FIG. 1 is a schematic illustration of a typical windshield wiper system.

Referring initially to FIG. 1, there is illustrated a typical windshield wiper system 10 for utilization on a car 12 having a windshield 11. The system 10 includes a motor 13 having a crank 14 on the output shaft thereof. Rotatably affixed at each extremity of crank 14 are links 15a and 15b. Link 15a interconnects with the crank 17a of wiper 16a and link 15b interconnects with the crank 17b of wiper 16b.

Each of the rotatable connections 20 between the links 15 and the cranks 14 and 17 are, of course, rotatable and may be fabricated conveniently in accordance with the teachings of this invention. Alternatively, of course, only one of the joint 20 may be provided on each link 15, the other joint being a standard type of rotatable bearing having no provision for canting movement. In the latter case, of course, all of the cant from a particular link will be absorbed and compensated for by the single bushing 20 included thereon.

Figure 2:
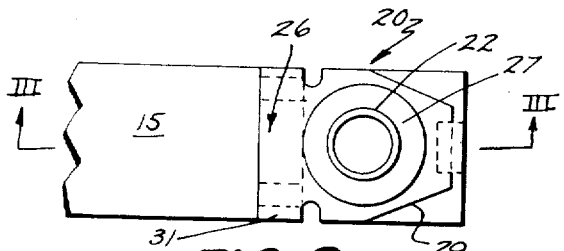
FIG. 2 is a fragmentary, plan view of a connecting link extremity incorporating the teachings of this invention.
Figure 4:
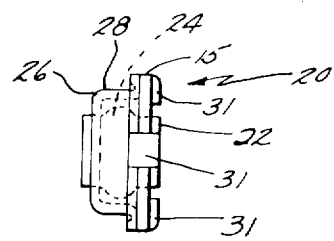
FIG. 4 is a front-elevational view of the device shown in FIG. 2.
Figure 3:
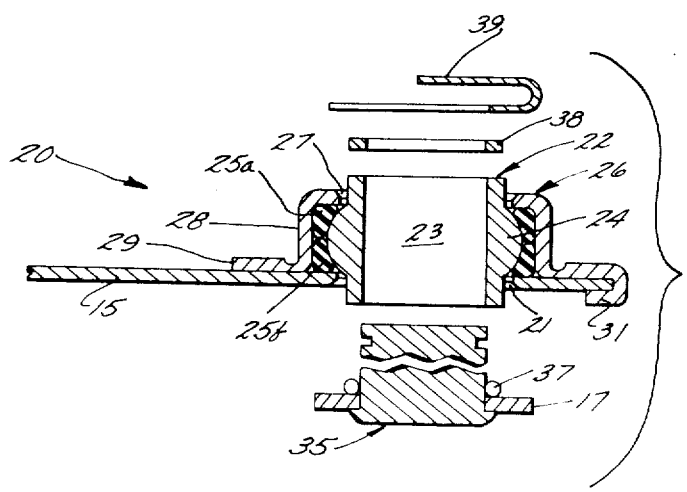
FIG. 3 is a cross-sectional view taken along the plane III—III of FIG. 2 and including, additionally, the component connecting stud and retainer clip in exploded fashion.

Referring now additionally to FIGS. 2 through 4, the bearing structure 20 which is the subject of this invention includes a circular opening 21 in the link 15. This opening may be punched directly into the flat link, the compartment to be discussed hereinafter being provided by the shaping of the cap. The cylindrical bearing member 22 is positioned on the link such that one of its axial extremities protrudes through opening 21. Bearing 22 has a cylindrical bore 23 and incorporates, on its outer surface, a radially extending spherical flange 24. Spherical flange 24 preferably circumscribes the complete perimeter of the bearing and constitutes the ball portion of a ball and socket joint as will be hereinafter described. Bearing 23 is fabricated from any of a number of suitably available antifriction materials and will comprise ordinarily an oil impregnated mixture of metals suitably sintered.

Positioned about the bearing 22 on the spherical flange 24 are conventional O rings 25a and 25b which cooperate to form a resilient seat for the flange. A cap or cover 26 having an opening 27 in the surface thereof, a depending circular skirt 28 and a base 29 retains the bearing and O rings in position with respect to the link 15. The bearing 22, as illustrated best in FIG. 3, protrudes through opening 27 in cap 26 and the cap may be affixed to the link by conventional tabs 31. It should be noted in this regard, that the link 15 is preferably notched on each side and at its end a depth equal to the thickness of the tabs 31 to positively stabilize the cap with respect to the link.

From an examination of FIG. 3, it will be apparent that the cap and link form in combination a compartment between the opening-containing, facing surfaces thereof. This compartment is circular in configuration and is sized such that the resilient O rings will be deformed when the cap 26 is affixed in the position illustrated so as to form a resilient seat resiliently restraining the bearing within the compartment and, yet, permitting canting movement thereof with respect to the link.

Assembly of the bearing structure, more particularly, is accomplished by placing the O rings 25a and 25b on the bearing 22 adjacent the axial ends of the spherical flange, inserting one end of the bushing in the opening 21 in link 15 and thereafter placing the cap in the position shown to compress the structure together. The O rings deform within the substantially straight-walled compartment partially filling the space between the side walls 28 and the spherical flange 24 forming a seat to give a much more central, more permanent and more firm location for the bearing within the compartment than has been achievable heretofore in the art. When assembled, the spherical flange 20 on bearing 22 in cooperation with the O rings 25a and 25b form a ball and socket joint thereby permitting canting and rotational movement of the link 15 with respect to the component to which it is attached. It should be noted, in this regard, that the diameter of the openings 21 and 27 must be substantially less than the outer diameter of the O rings in their installed position. There must, however, be sufficient clearance provided to permit the bearing to cant to the desired degree with respect to the link 15.

Once the device has been assembled in the manner described and illustrated, it may be rotatably connected to a stud 35 (FIG. 3) having the operative component as, for example, cranks 14 or 17 to which the link is to be connected fastened thereon in nonrotatable fashion such as by fastener 37. The stud body is passed through the bore 23 of bearing 22, a washer 38 placed thereover and a suitable fastener 39 installed in the groove in the stud. Such assembly, of course, is conventional in the art.

In utilization of the bushing structure which is the subject of this invention, as the crank arm 14 is rotated by motor 13, the stud 35 will rotate wihin bore 23 of bearing 22. Canting forces occurring in the linkage system because of the relative positions of the various components will cause the bearings 22 to twist or cant with respect to the link 15, such canting being permitted by the resilient nature of the O rings 25 and by the relative rotation between the spherical flange and the O rings. The canting is assisted markedly by the circular configuration of the resilient members 25 since, as the bearing begins to cant, they will roll slightly. The instant invention depends, thus, not only upon the strict deformation of the resilient members but, additionally, upon the relative rotation between the members and the spherical flange. This partciular facet of the invention, it has been found, affords a much superior and more easily canting structure than has been available heretofore in this art.

As the linkage moves from position to position, of course, the canting forces will periodically dissipate and then, perhaps, be exerted in a different direction. Upon dissipation of the force, the bearing will retain its relative position until acted upon in a different direction. In the above-described prior art construction, a constant biasing force is applied on the bushing and associated mechanisms because of the tendency of the resilient members to return to their original encased configuration. With the ball and seat construction of the present invention, wear on the bore of bearing 23 and the stud 35, as well as the other components in this system, is minimized.

While a preferred embodiment of this invention has been described in detail, it will be readily apparent to those skilled in the art that other embodiments can be conceived and fabricated without departing from the spirit and scope of this invention. Such other embodiments are to be deemed as included within the scope of the following claims unless these claims, by their language, expressly state otherwise.

The embodiments of the invention in which an exclusive property or privilege is claimed are defined as follows:

1. In a windshield wiper transmission system for transmitting and converting the output of a motor to oscillatory movement of a pair of wiper arms including articulated linkage having an elongated link with a bearing means at at least one extremity thereof for rotatably receiving a stud connected to another component of said system, the improvement in said bearing means comprising:

an opening in said elongated link;

a bearing retaining cover having an opening therein affixed to said link over the opening in said link such that said openings are generally aligned, the facing surfaces of said cover and link containing said openings being spaced from one another by a skirt-like member to define a generally enclosed compartment therebetween;

a cylindrical sleeve bearing having a spherical flange on the outer surface thereof near the axial midpoint thereof, one axial extremity of said bearing protruding through the opening in said link, the other axial extremity of said bearing protruding through the opening in said cover, said spherical flange being positioned within said compartment;

a first resilient ring-like member positioned about said bearing surrounding one side of said spherical flange; and a second separate resilient ring-like member positioned about said bearing surrounding the other side of said spherical flange, said members cooperatively forming a resilient spherical seat for said spherical flange, the relative dimensions of said compartment, said members and said spherical flange being such that said bearing is resiliently restrained within said compartment by said members to permit both canting and rotational movement of said link with respect to said stud.

2. The system as set forth in claim 1 wherein the outer dimensions of said spherical flange exceed the dimensions of said openings.

3. The system as set forth in claim 1 wherein said skirt forms an integral part of said cover.

4. The system as set forth in claim 3 wherein that portion of said link containing the opening is generally planar.

5. The system as set forth in claim 1 wherein said members are generally circular in cross section.

6. The system as set forth in claim 1 wherein said compartment is circular.

7. In a windshield wiper transmission system for transmitting and converting the output of a motor to oscillatory movement of a pair of wiper arms including articulated linkage having an elongated link with a bearing means at at least one extremity thereof for rotatably receiving a stud connected to another component of said system, the improvement in said bearing means comprising:
    an opening in said elongated link;
    a bearing retaining cover having an opening therein affixed to said link over the opening in said link such that said openings are generally aligned, the facing surfaces of said cover and link containing said opennigs being spaced from one another by a skirt-like member to define a generally enclosed compartment therebetween;
    a cylindrical bushing positioned within said compartment having a spherical central section and oppositely disposed cylindrical ends, one of said ends projecting through the opening in said link, the other of said ends projecting through the opening in said cover;
    a pair of resilient ring-like members surrounding said spherical central section of said bushing cooperatively forming a seat therefor, the relative dimensions of said compartment, said members and said spherical central section being such that said bearing is resiliently restrained with said compartment by said members to permit both canting and rotational movement of said link with respect to said stud.

8. The apparatus as defined in claim 7 wherein said resilient ring-like members are O rings.

9. The apparatus as defined in claim 8 wherein the outer dimensions of said spherical central section exceed the dimensions of said openings.

10. The system as set forth in claim 9 wherein said skirt forms an integral part of said cover.

11. The system as set forth in claim 10 wherein that portion of said link containing the opening is generally planar.

12. The system as set forth in claim 7 wherein said compartment is circular.

References Cited
UNITED STATES PATENTS 3,316,033    4/1967    Bila _____ 308—72

EDGAR W. GEOGHEGAN, Primary Examiner

F. SUSKO, Assistant Examiner